US012583118B2

(12) United States Patent
Campos Macias et al.

(10) Patent No.: US 12,583,118 B2
(45) Date of Patent: Mar. 24, 2026

(54) ROBOTIC DEVICE WORKSPACE MAPPING

(71) Applicant: Intel Corporation, Santa Clara, CA (US)

(72) Inventors: Leobardo Campos Macias, Guadalajara (MX); Julio Zamora Esquivel, Zapopan (MX); Paulo Lopez Meyer, Zapopan (MX); Hector Alfonso Cordourier Maruri, Guadalajara (MX); Alejandro Ibarra Von Borstel, Manchaca, TX (US); Edgar Macias Garcia, Zapopan (MX)

(73) Assignee: Intel Corporation, Santa Clara, CA (US)

( * ) Notice: Subject to any disclaimer, the term of this patent is extended or adjusted under 35 U.S.C. 154(b) by 145 days.

(21) Appl. No.: 18/397,030

(22) Filed: Dec. 27, 2023

(65) Prior Publication Data
US 2025/0214242 A1 Jul. 3, 2025

(51) Int. Cl.
*B25J 9/16* (2006.01)
(52) U.S. Cl.
CPC .............. *B25J 9/1684* (2013.01); *B25J 9/163* (2013.01); *B25J 9/1664* (2013.01)
(58) Field of Classification Search
CPC ........ B25J 9/1684; B25J 9/163; B25J 9/1664; B25J 5/007; B25J 9/162; B25J 9/1656; B25J 9/1697; B25J 11/0085; B25J 19/021; B25J 19/022; A47L 2201/00; A47L 2201/04; G05B 2219/35145; G05B 2219/40423; G05B 2219/40442
See application file for complete search history.

(56) References Cited

U.S. PATENT DOCUMENTS

| | | | |
|---|---|---|---|
| 2019/0015981 A1* | 1/2019 | Yabushita | B25J 5/007 |
| 2022/0022716 A1* | 1/2022 | Wu | G05D 1/648 |
| 2024/0152160 A1* | 5/2024 | Chen | G05D 1/2464 |
| 2025/0068171 A1* | 2/2025 | Song | A47L 11/4011 |

OTHER PUBLICATIONS

Blanke et al "Flexible creation of a 3D-Map in an unknown environment by a robot" 2021, IEEE 26th International Conference on Emerging Technologies and Factory Automation (Year: 2021).*

* cited by examiner

*Primary Examiner* — Esvinder Singh
(74) *Attorney, Agent, or Firm* — Banner & Witcoff, Ltd.

(57) ABSTRACT

System and techniques to map a workspace for a robotic device are described herein. The robotic device has a movable portion with a sensor that is used to capture readings from part of the workspace. These readings are used to map a portion of the workspace and then to plot a new position of the movable portion to get readings for another part of the workspace. As the technique iterates, the robotic device is able to safely and efficiently map the entirety of the workspace.

20 Claims, 7 Drawing Sheets

605   RECEIVE WORKSPACE SENSOR DATA

610   DETECT WORKSPACE FEATURES IN SENSOR DATA

615   RECORD THE FEATURES IN MAP

620   OBTAIN SENSOR BOUNDARY FROM FEATURES

625   MOVE SENSOR BASED ON BOUNDARY

ROBOTIC DEVICE WORKSPACE MAPPING

BACKGROUND

An articulate robotic arm with an end-effector is a type of robotic system. The robotic arm—often powered by electric motors or hydraulics—typically has multiple segments connected by joints that provide motion along different axes. The end-effector—such as a hand, tool, implement, etc.—is a device at the end of the robotic arm that interacts with the environment. End-effectors may be tools designed for a specialized task such as grippers for grasping objects, vacuums for lifting material, drills for drilling holes, etc. Control systems (e.g., hardware, software, or both) direct the operation of the robotic arm and end-effector to perform tasks. Feedback signals may provide closed-loop control by supplying information to the control system on the status of the robotic system during operation. Robotic systems with end-effectors have found widespread adoption for repetitive and dangerous tasks in manufacturing, construction, defense, or other domains.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5 illustrates an example of pyramidal map compression, according to an embodiment.

DETAILED DESCRIPTION

Figure 1:
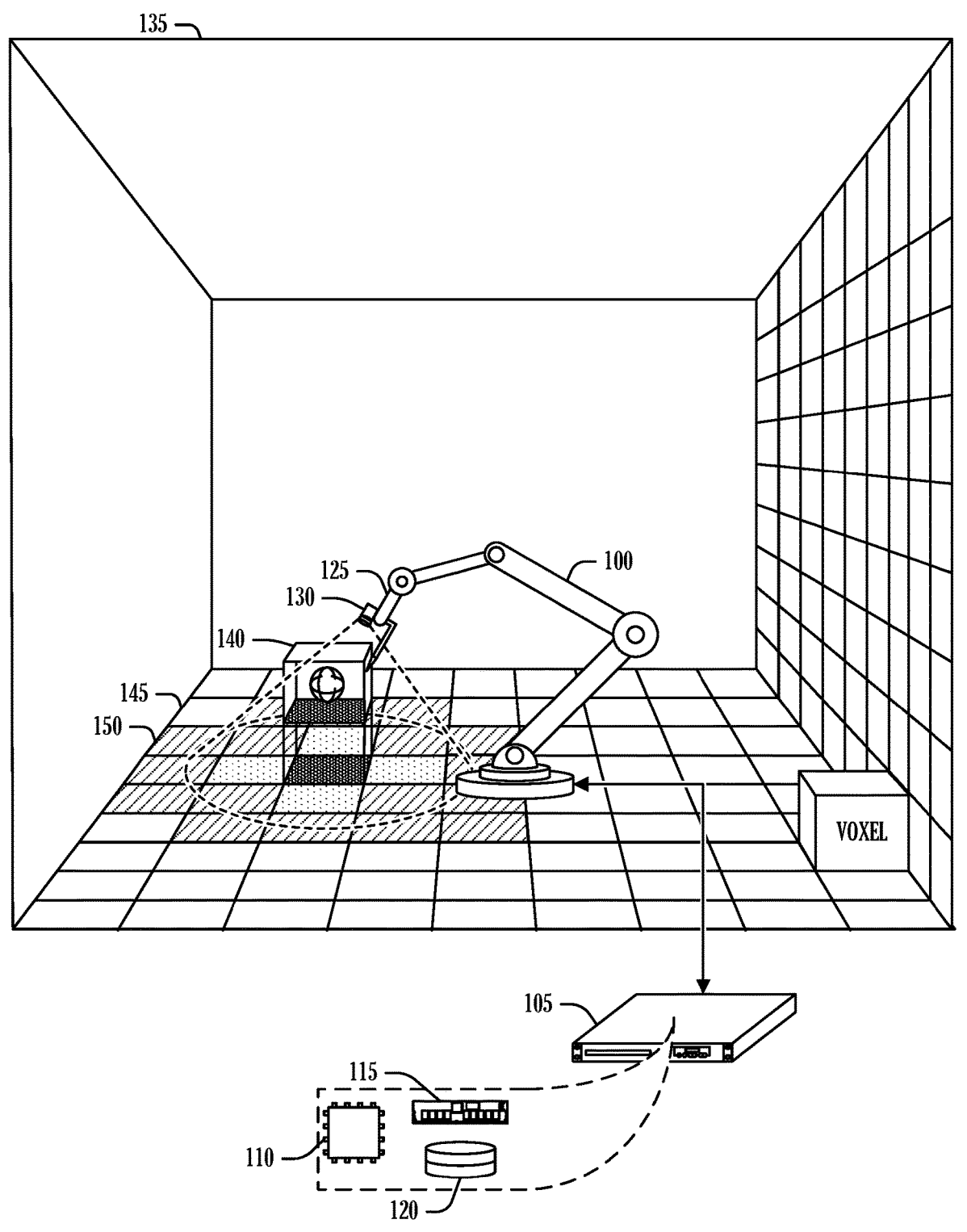
FIG. 1 is a block diagram of an example of an environment including a system for robotic device workspace mapping, according to an embodiment.

The size or power of some robotic devices may pose dangers to people working in the area of the robotic devices. Often, collaboration between humans and articulated robots is limited by confining manipulators in confined static spaces to maintain an appropriate level of safety. These working environments are generally inspected and mapped to enable robotic device path planning that does not exceed the workspace or collide with obstacles within the workspace. Thus, the contents of these workspaces are generally maintained (e.g., not changed) after the mapping. Dynamic scenarios, such as a human entering the workspace, are challenging. The challenge arises because the measurements used for an accurate and safe mapping of the workspace are difficult to obtain from sensors mounted in the workspace, in part, because the sensors may be obstructed by new objects entering the workspace.

Robotic device workspace mapping is often an expensive and time-consuming process that limits the feasible frequency of changes to a workspace. Some workspaces are equipped with instrumentation to scan and detect a new configuration (e.g., obstacles, objects, people, etc.) of the workspace. These arrangements, however, often rely on careful calibration of the sensors to ensure safe tool paths for the robotic device. This calibration can be difficult to establish or maintain. Further, as noted above, the sensors (e.g., instrumentation) are generally fixed with limited fields of view. This can result in certain workspace configurations obstructing the sensors with objects and preventing a full modeling of the new workspace configuration. These sensor arrangements also tend to produce a large amount of data that causes issues with scaling because communication bandwidth to a tool path controller will ultimately limit the accuracy of larger workspace sensing.

To address these issues, several techniques may be employed. For example, mathematical modeling may be used to provide an accurate representation of the workspace. However, mathematical modeling usually uses significant computing resources and is often restricted to certain object shapes—such as convex obstacles—in the workspace. Artificial neural networks (ANNs) are a more recent approach that generally have good generalization capabilities. Neural Radiance Field (NERF) techniques, for example, are ANNs trained to generate a render of scenes from sensor data views of the scenes. ANN models, however, tend to be large and often use powerful computing hardware (e.g., graphics processing units (GPU) or other single-instruction-multiple-data (SIMD) processing arrangements, among others) for practical implementations. Volume division of space is another technique that may be used. Here, grid-based techniques are often used because high volumes may be represented independently of the object shape and mapped to a data structure.

To address the issues noted above, a framework for generating a virtual map of a working space is described below. This framework uses an articulated manipulator (e.g., robotic device) with a sensor mounted on a movable portion of the robotic device, such as a single sensor (e.g., camera) mounted at the end effector (e.g., gripper). The framework uses a technique by which the sensor captures a portion of the workspace and ascertains the position of obstacles as well as sensor boundaries. Then, a search technique is used to find a new pose of the robotic device that enables the sensor to capture readings of at least partially unsensed areas of the workspace in an efficient manner. The search prefers to limit robotic device movement to areas that have already been cleared of obstacles. Thus, the framework enables the robotic device to safely model the workspace without the difficulty and expense of the techniques noted above. In an example, the framework employs a pyramidal compression on the modeling of the workspace to enable an efficient communication of obstacle locations to a remote device, enabling large models to be efficiently communicated over limited bandwidth communication paths. Additional examples and details are described below.

FIG. 1 is a block diagram of an example of an environment including a system for robotic device workspace mapping, according to an embodiment. As illustrated, the environment includes a robotic device 100 located within a workspace 135 and connected to a controller 105. The robotic device includes a movable portion (e.g., end effector 125) to which a sensor 130 is affixed. In an example, the robotic device 100 is an arm (as illustrated). In an example, the robotic device 100 includes a member that is fixed to a structure of the workspace 135. Thus, the robotic device 100 may be anchored (e.g., via bolt, adhesive, etc.) to a floor, table, etc. of the workspace 135. In an example, a mass of the robotic device 100 and a lack of wheels or other device affixes the robotic device 100 such that the robotic device 100 cannot move without intervention by another device.

In FIG. 1, the grid represents voxels—which are three-dimensional versions of pixels—within the workspace, though only a few voxels are illustrated in all three dimensions for clarity. The sensor 130 has a field of view—illustrated by the dashed circle and lines—that is less than the entirety of the workspace 135. In FIG. 1, the bottom of the voxels are shaded to indicate a status, such as occupied voxel 140 (dark shading), unoccupied (light shading), sensor boundary voxel 150 (diagonal line shading) or unknown voxel 145 (no shading).

The controller 105 may be part of the robotic device 100, such as within a housing of the robotic device 100, or remote and connected to the robotic device by a network or direct communications lines. The controller 105 includes processing circuitry 110 (e.g., a central processor unit (CPU), GPU, etc.), storage 120 (e.g., a hard drive, solid-state drive, storage class memory, etc.), and working memory 115 (e.g., volatile random access memory (RAM)). For clarity, the following examples use the controller as the entity effectuating the techniques, however, other combinations of hardware or software may be used, such as a cloud service, cluster, etc.

The processing circuitry 110 is configured—for example by software stored in the storage 120 or the working memory 115 and executing on the processing circuitry 110—to obtain sensor data of the workspace 135. To obtain the sensor data, the processing circuitry 110 may request the sensor 130 capture the sensor data, the sensor 130 may capture the sensor data periodically and send it to the controller 105, or any combination of the two. In an example, the sensor 130 is a depth camera. A depth camera generally captures depth information for each pixel in the produced image. The pixels may or may not also contain light-spectrum information (e.g., color) from the scene. The depth is a distance from the sensor 130 to an object. Depth cameras use different techniques for measuring this distance, from timing light emission reflections to projecting light patterns and measuring distortions (e.g., scaling) of the pattern in reflections, to stereoscopic arrangements.

The processing circuitry 110 is configured to detect features of the workspace 135 from the sensor data. This feature detection may take many forms. For example, the feature detection may include identifying a feature when the distance from the sensor 130 to the voxel is less than a threshold (e.g., representing the borders of the workspace 135). Other detection techniques may use object identifiers, implemented with color or shading techniques, ANN techniques, etc. The feature detection results in the detection of obstacles, such as the obstacle illustrated in the voxel 140, over noise that may be present in the sensor data.

The processing circuitry 110 is configured to record the detected features of the workspace 135 in a map (e.g., model) of the workspace. In an example, the map has three dimensions, and the features of the workspace are represented by voxels (as illustrated). The use of voxels provides a regular way of representing three-dimensional space in a manner similar to representing two-dimensional space in pixels. Voxel representations, e.g., as opposed to individual models for objects within the workspace, enable some additional benefits for compact representations of the map data.

In an example, the voxels are stored in the map with a bitwise representation in which a first set of bits represents a depth dimension (e.g., z), a second set of bits represents a width dimension (e.g., x), a third set of bits represents a height dimension (e.g., y), and a fourth set of bits represents a status. In an example, the status is at least one of UNKNOWN (e.g., voxel 145), BOUNDARY (e.g., voxel 150), FREE, or OCCUPIED (e.g., voxel 140). In an example, the map is initialized such that entries in the map have values corresponding to UNKNOWN. Here, whenever a review of the workspace 135 is begun, the map for the review—there may be different versions of the map—is initialized to UNKNOWN. During the course of the review, the voxels are changed to a different status as the sensor 130 is able to view the variations parts of the workspace 135. Thus, in an example, the status of OCCUPIED corresponds to a feature in the sensor reading. That is, the sensor reading indicated that there is something at the voxel that is marked OCCUPIED. In an example, the status of FREE corresponds to an absence of a feature in the sensor reading in the field of view of the sensor 130 when data from the sensor 130 is captured. Thus, the sensor 130 collected data on the space corresponding to the voxel but nothing was detected in that space. In an example, the status of FREE is determined by tracing a ray from a position corresponding to the sensor 130 in the map to either an entry with the value of OCCUPIED or a boundary of the workspace 135. In an example, the bitwise representation is 32 bits, and each of the depth dimension, the width dimension, and the height dimension are each represented by 8 bits.

The processing circuitry 110 is configured to determine a sensor boundary (e.g., voxel 150) is determined from the sensor data. In an example, the sensor boundary is an entry in the map with a neighbor entry that has a value corresponding to UNKNOWN. The sensor boundary is a map entry (e.g., voxel) with a value other than UNKNOWN with a neighbor entry that has a value of UNKNOWN. The sensor boundary is used to plan a path for the robotic device 100—and usually more specifically the movable portion—to map additional areas of the workspace 135.

The processing circuitry 110 is configured to move the movable portion of the robotic device 100 based on the sensor boundary to place the field of view of the sensor 130 on a second portion of the workspace 135. This planned movement enables the sensor 130 to capture additional portions of the workspace 135 that, when chained together with additional feature capture and movements, enables the controller 105 to map the entire workspace 135.

In an example, moving the movable portion of the robotic device 100 includes calculating a goal pose of the movable portion of the robotic device 100 and moving the movable portion of the robotic device 100 to meet the goal pose. The goal pose includes a position of the movable portion that accounts for location within the volume of the workspace 135 as well as an orientation of the sensor 130. Accordingly, a goal pose may include rotating the sensor 130 without otherwise moving the robotic device 100, moving the robotic device 100 without rotation of the sensor 130, or a combination of both. In an example, calculating the goal pose includes finding multiple possible goal poses. This example acknowledges that several possible goal poses are available to the controller 105. In an example, the multiple possible goal poses are randomly generated. In an example, a rapidly exploring random tree is used to create a motion movement to reach one of the multiple possible goal poses. Other goal pose generation techniques may also be used, such as a defined search space based on a present orientation or position of the movable portion.

In an example, the processing circuitry 110 is configured to select the goal pose based on a cost function. In this example, one of the several available goal poses is chosen because the selection of the goal pose minimizes the metric of the cost function. The cost function may have one or more metrics, such as time to achieve the goal pose, power exerted in achieving the goal pose, distance traversed, etc. Thus, in an example, the cost function is based on a present pose of the sensor 130. In an example, the cost function weights maintaining a present orientation of the sensor 130 as more valuable (e.g., less costly) than changing the present orientation of the sensor 130. In an example, the cost function weights movement from the present pose of the sensor 130 through map entries with a value corresponding to FREE as more valuable (e.g., less costly) than movement through map entries with another value. This last cost acknowledges that moving through areas of the workspace 135 that have already been observed and deemed free of obstacles is preferable (e.g., more valuable) than moving through UNKNOWN areas, for example, because the chance of the robotic device 100 colliding with an obstacle are reduced.

Figure 5:
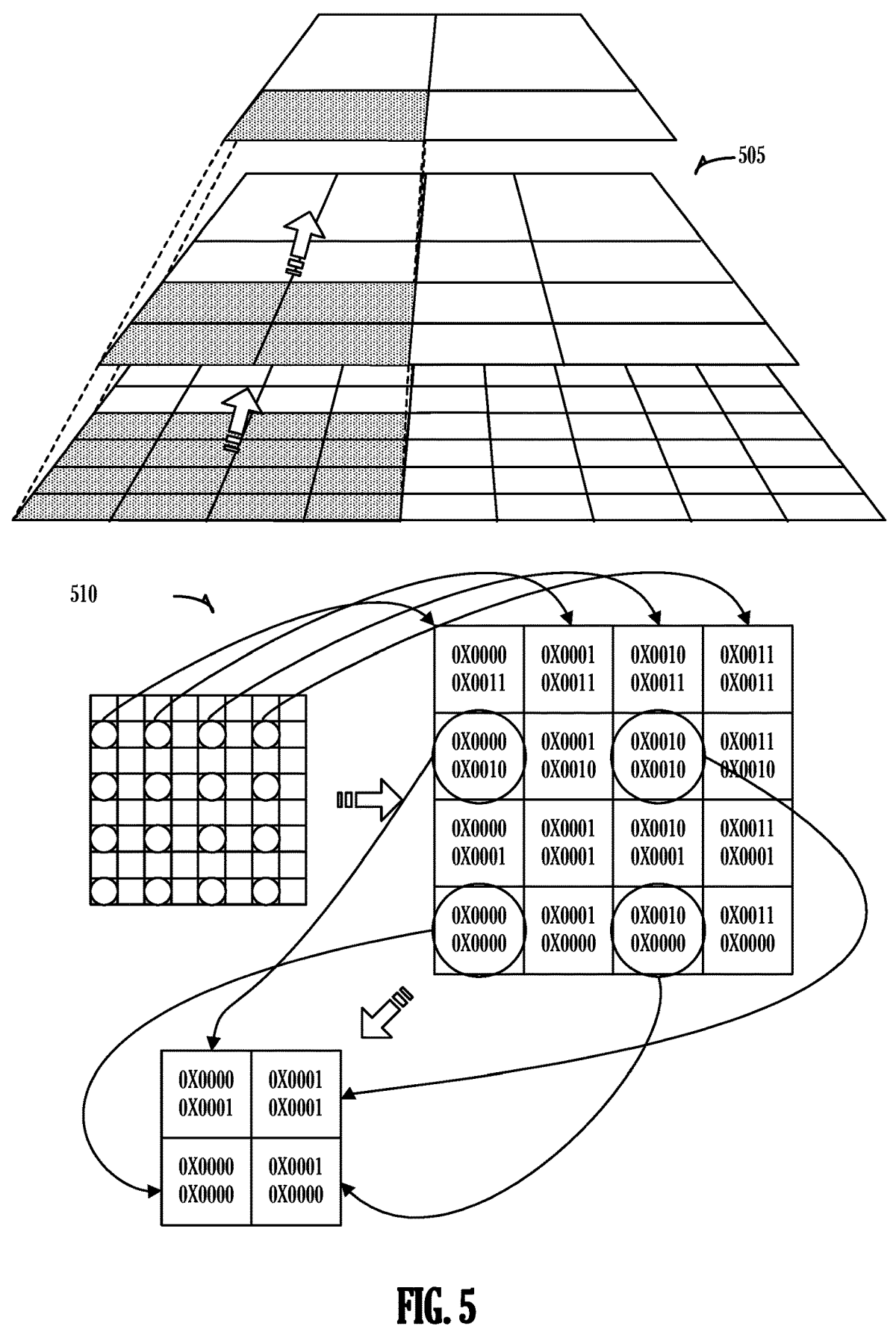

As the elements of recording features from sensor data, moving the sensor 130, and recording additional features are repeated, the map of the workspace approaches completion. Once the map is completed, or while the map is being built, the map may be communicated to an external entity, such as a remote workstation that enables a human to interact with the robotic device 100. To help with bandwidth issues that may arise with such remote communications, in an example, the processing circuitry 110 is configured to create a compressed map. The compressed map may be created by compressing the map into a pyramidal representation at different resolutions. In an example, the compressed map includes entries with values corresponding to OCCUPIED. An example of such a representation is illustrated in FIG. 5 and described below.

Figure 2:
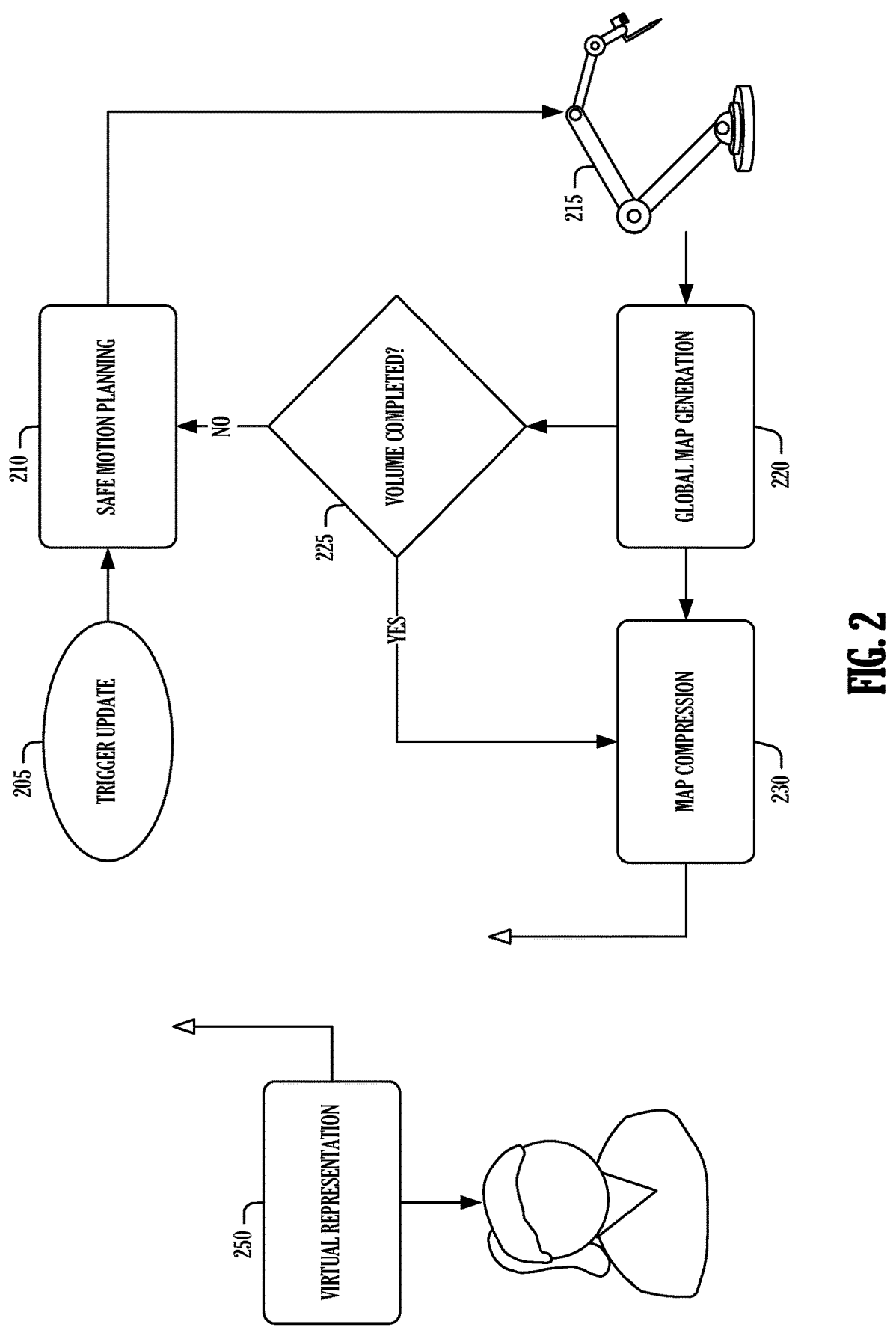
FIG. 2 illustrates an example control flow for scene virtualization, according to an embodiment.

FIG. 2 illustrates an example of a framework for scene virtualization, according to an embodiment. As illustrated, a trigger 205 is issued to initiate a map update. The trigger may be periodic (e.g., daily, weekly, etc.) or event-based. Event-based triggers may be based on a failure detected by the robotic device 215, such as bumping into an obstacle, or be based on an external stimulus, such as an instruction by an operator. A controller executes motion planning 210 to move the robotic device 215 and orient a sensor to a portion of the workspace. The controller uses the sensor data to perform global map generation 220 of the workspace. As long as the workspace volume includes unmapped portions (decision 225), the motion planning 210 and global map generation 220 continues. Upon mapping of the workspace volume, the map compression 230 may occur for transmission to a remote station where, for example, a virtual representation 250 of the workspace may be generated from the map.

The illustrated arrangement enables generation of a virtual map of a working space using a remote articulated manipulator with only a camera at the end effector. The technique enables the generation of a three-dimensional reconstruction of the robotic device 215 workspace by sequenced movements provided by a motion selection algorithm that avoids present obstacles. Additionally, the framework provides a compression technique based on pyramidal hash keys for fast map communication to, for example, transmit the representation of the robotic device 215 workspace for human-remote-robot collaboration.

In an example, the framework includes a motion planning technique for optimal movement generation that builds a three-dimensional environment representation of the robotic device 215 workspace. The framework may provide a hash-key encoding that permits low-level bit access to voxel properties. The framework may provide an orthogonal-based end-effector goal-generation methodology for adequate obstacle mapping. The framework may provide a path planning algorithm to drive robotic device 215 movements inside the explored space. The framework may provide a pyramidal compression for scene representation for efficient map communication over networks. In an example, the framework may provide a human user interface for robot interaction in unknown scenarios.

Figure 3:
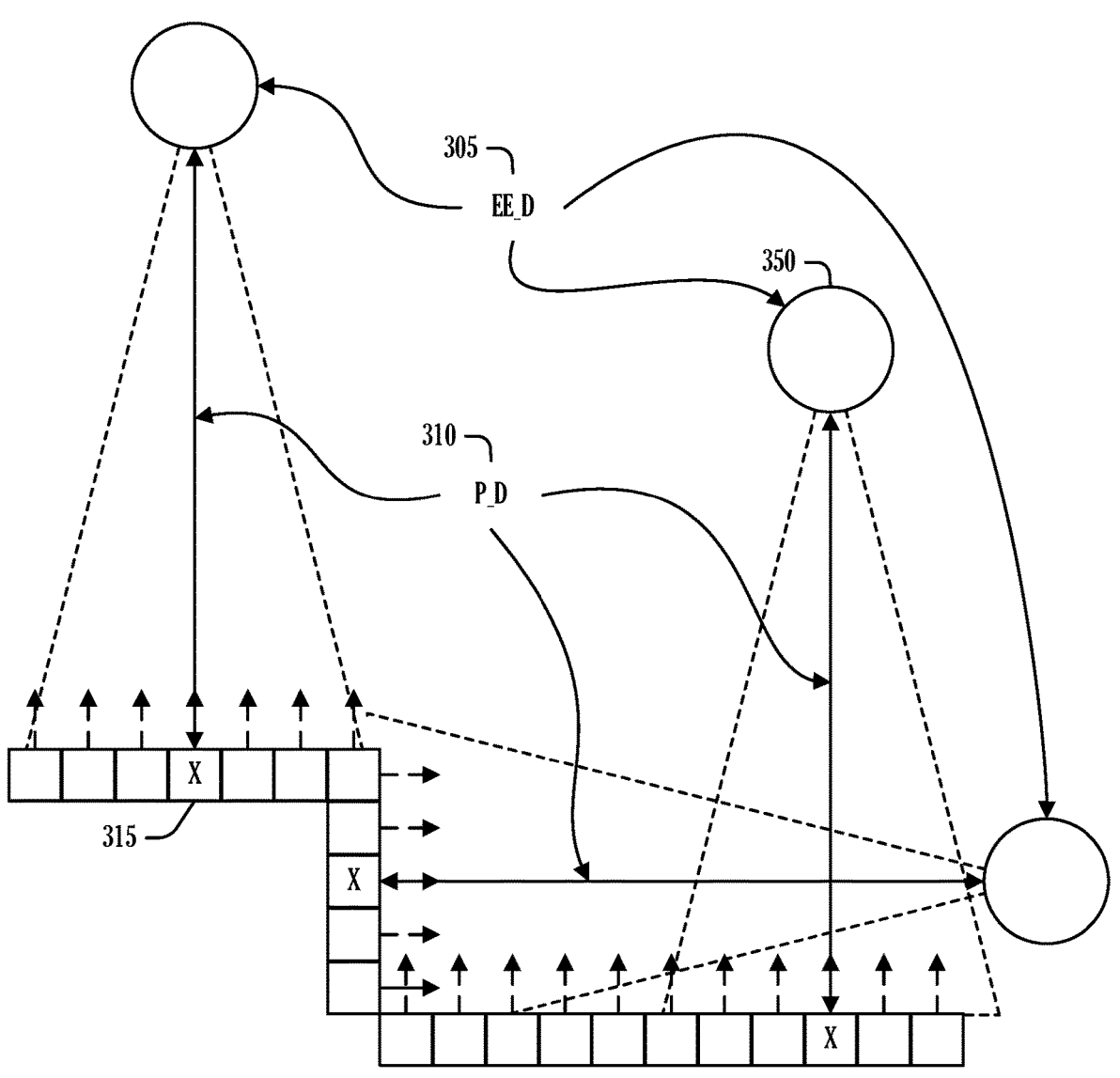
FIG. 3 illustrates an example of effector positioning, according to an embodiment.

FIG. 3 illustrates an example of effector positioning, according to an embodiment. As illustrated, $EE_d$ 305 represents end effector goal positions, such as end effector position 350. $P_d$ 310 represents a proximity distance from the end effector to a surface—the measurement position on the surface marked with an X such as position 315—that results in the field of view (e.g., frustum) illustrated in dashed lines from respective $EE_d$ 305 values. Within this context, the following describes an example of a motion algorithm for mapping the workspace or an interest portion within the workspace.

In these examples, it is assumed that the robotic device has a camera attached at a gripper location. In an example, the camera may provide red-green-blue (RGB) (e.g., human visual spectrum) information as well as depth information. Also, it is assumed that the robotic device starts in an obstacle-free space and is able to rotate the last joint (e.g., the end effector) without colliding with an obstacle. Within this context, a first operation may include discretizing (e.g., quantizing) the workspace in equal-sized boxes (e.g., voxels) with a predefined size (e.g., radius), which is the target resolution of the map. Initially, all the voxels are considered to be in an unknown observability state in this example.

In an example, the techniques use a hash function of thirty-two bits that contain all the information of the voxel localization (e.g., x-y-z cartesian coordinates), observability state, and occupancy. In this example, the first twenty-four bits encode the x, y, and z coordinates, and the last 4 bits represent the state of the voxel as follows:

$$\bar{O} = \begin{cases} 0x0000 \rightarrow \text{Unknown} \\ 0x0001 \rightarrow \text{Frontier} \\ 0x0010 \rightarrow \text{Free} \\ 0x0011 \rightarrow \text{Occupied} \end{cases}$$

The complete hash key may be represented as follows.

$$key = cat\{\bar{x}, \bar{y}, \bar{z}, \bar{O}\},$$

where $$\bar{x} = \left\lfloor \frac{x}{r} \right\rfloor, \bar{y} = \left\lfloor \frac{y}{r} \right\rfloor, \bar{z} = \left\lfloor \frac{z}{r} \right\rfloor,$$

with r being the voxel discretization radius and the brackets $\lfloor \; \rfloor$ representing the floor operation (e.g., the mathematical floor function).

With the unique hash key (e.g., key) for the voxel, any coordinate in the map may be accessed directly (e.g., via hash lookup techniques) and the last two bits consulted (e.g., using only bit level operations) to determine the state of that voxel. The two upper bits of the voxel hash key $\overline{0}$ may be used to represent other voxel states. With this hash representation, using a voxel radius resolution of one centimeter, a volume of 1 cubic meter is efficiently represented, consuming only four megabytes (MB) of space (e.g., memory). This is often enough to describe the workspace of most of the robotic manipulator arms.

The observability and occupancy states are used in the following optimized map discovery algorithm. A ray starting from the camera's optical lens that can traverse a voxel is categorized as free. A voxel that contains more than a threshold of points detected by the camera (e.g., one or more features) is marked as occupied. A free voxel where at least one of its neighbors (e.g., surrounding voxels) is unknown is changed to frontier (e.g., sensor boundary). The remaining non-classified voxels are categorized as unknown. This voxel state convention enables obtaining all voxels marked as occupied, free, or frontier, by applying an AND bit-wise operation with a corresponding mask (e.g., for occupied, free, etc.) for the marking to map entries to retrieve voxels with a particular state.

The movement technique is designed to cover all frontier voxels with minimal movements and prevent workspace collisions by attempting to move the robotic device segments through free voxels. The following pseudo-code (Algorithm 1) is an example implementation of the technique:

together with the normal vector, are pushed to a Visit_List. In an example, any probabilistic method may represent the occupancy/freedom of the voxels. When the voxel hash is used, accessing the list occurs in constant time, as is the case with hash maps.

Once a frame is processed, a next frustum goal is calculated. It is assumed that the transformation from the optical camera frame to the end effector is known. Then, as illustrated, a possible end effector goal is computed for each voxel and normal vector in the Visit_List. Each voxel center (e.g., marked with an X) is considered to match the possible frustum, where the proximity distance $P_d$ 310 is selected based on a desired resolution; the higher the resolution, the closer the camera should be to the frontiers. Thus, a list of possible cartesian poses $EE_d$ 305 (e.g., positions and orientations) for the end effector are generated. The closer to the current end-effector pose is selected as the next goal pose— e.g., using the Euclidean norm—the more likely the pose will be selected to reduce mapping path length and time.

Figure 4:
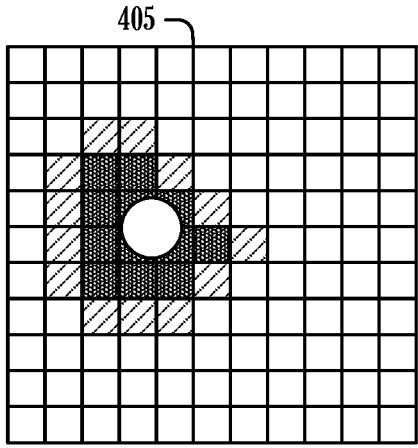
FIG. 4 illustrates an example of a sequence of obstacle mapping, according to an embodiment.
Figure 4:
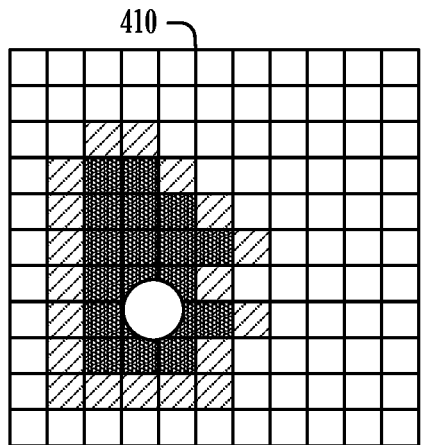
Figure 4:
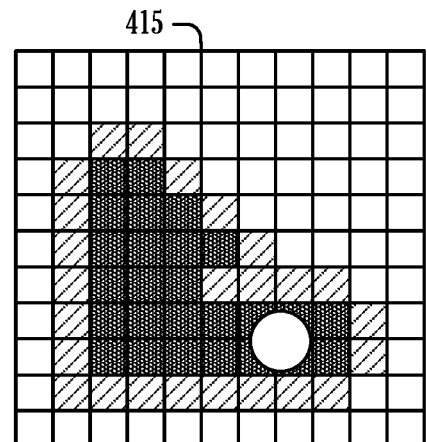
Figure 4:
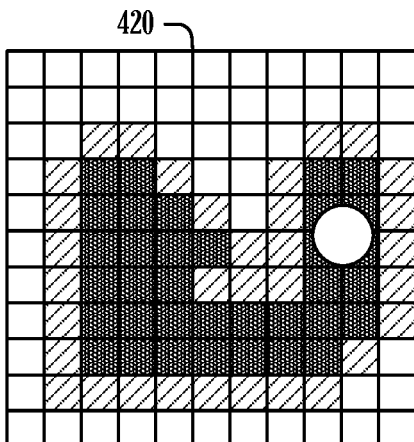

FIG. 4 illustrates an example of a sequence of obstacle mapping, according to an embodiment. Specifically, FIG. 4 illustrates an example of a mapping procedure sequence (e.g., as described above) reduced to a plane (e.g., the floor). Blank pixels (the plane representation of the voxels) are unknown and shaded pixels have been observed and mapped. The diagonal shading represents frontier pixels.

```
INPUT : Map, Depth_Frame, Joints
OUTPUT : Map, Visit_List
 1    point_cloud ← 3D_REPROJECTION (Depth_ Frame, CAM_ PARAMS)
 2    FOR point IN point_ cloud:
 3        X,Y,Z ← HASH_ COORDINATES (point.x, point.y, point.z)
 4        key ← HASH (X,Y,Z, 0x0011)
 5        Map[key] = key
 6    ENDFOR
 7    free-points ← RAYTRACING (point_cloud, Joints)
 8    FOR point IN free_points :
 9        X,Y,Z ← HASH_ COORDINATES (point.x, point.y, point.z)
10        key ← HASH (X,Y,Z, 0x0010)
11        Map[key] = key
12        neighbors ← GET_ NEIGHBORS (point.x, point.y, point.z)
13        FOR neighbor IN neighbors :
14            X,Y,Z ← HASH_ COORDINATES (neighbor.x, neighbor.y, neighbor.z)
15            key ← HASH (X,Y,Z, 0x0001)
16            IF Map [key] NAND 0x0010 :
17                Map [key] = key
18                normal ← NORM (Joints , neighbor.x, neighbor.y, neighbor.z)
19                Visit_List . append (key, normal)
20            ENDIF
21        ENDFOR
22    ENDFOR
```

As noted earlier, the map starts with all the workspace volume discretized with all voxels marked as unknown. Then, a camera depth frame is received. This depth frame may be reprojected to three-dimensional space using intrinsic or extrinsic parameters of the camera matrix to produce a point cloud with features that represented occupied areas (e.g., line 1 of Algorithm 1). Then, the hash is computed using the point coordinates and occupied state for each point in the point cloud is produced (lines 2-6 of Algorithm 1).

The raytracing may be computed using a camera frustum. For examples, for all voxels that lie inside the camera frustum, the voxel state is changed to free, and the neighbors of the voxel that are not free or occupied (line 16 of Algorithm 1) are changed to the frontier state. The normal respect to the voxel surface may also be calculated using a cross-product and may be used to compute a goal pose to keep building the map. In an example, all the frontier voxels The occupied, free, and frontier voxel cells are updated with the first depth image arrival in the first image sequence (e.g., map 405). The closest frontier is selected as described above, and the frustum moved toward this end effector goal, depicted in the subsequent map 410, then map 415, and then map 420. Thus, the process is repeated until the Visit_List is empty and there are no voxels with frontier states available.

A trajectory is plotted that moves the robotic device from a current position towards a selected frontier, preferring traversal of free voxels. In an example, the optimal rapidly exploring random tree (RRT*) algorithm may be used. Algorithm 2 is represented in the following pseudo-code:

```
INPUT : EE_a, EE_d
OUTPUT : q(t)
```

-continued

```
1    Tree <- INSERT (EE__a)
2    WHILE TRUE :
3        EE__r ← RANDOM ( )
4        EE__nearesst ← NEAREST (EE__R, Tree)
5        EE__closest = EE__nearest[0]
6        IF FEASIBLE (EE__r, EE__closest) :
7            cost ← COST (EE__r, EE__closest)
8            tree ← INSERT (EE__r, cost)
9            FOREACH EE__near IN EE__nearest [1:] :
10               IF FEASIBLE (EE__r, EE__near) :
11                   IF IMPROVED__COST (EE__r, EE__near) :
12                       tree ← REWIRE (EE__r, EE__near)
13                   ENDIF
14               ENDIF
15           ENDFOREACH
16           IF END__CONDITION (EE__r, EE__d) :
17               q(t) ← CREATE__SOLUTION( )
18               BREAK
19           ENDIF
20       ENDIF
21   ENDWHILE
```

Algorithm 2 accepts a current end-effector pose $EE_a$ and a final end-effector goal $EE_a$ as input and produces a collision-free trajectory q(t)—considering the currently mapped environment—that fulfills dynamical constraints on the robotic device and favors traversing through observed free voxels. Algorithm 2 generates a random cartesian pose $EE_r$ (line 3 of Algorithm 2) inside the workspace of the robotic device. However, it is worth note that the constraint is not strictly enforced. If the robotic device is unable to reach a cartesian pose, this random cartesian pose is rejected (line 6 of Algorithm 2). Nodes in the Visit__List within the radius and with a lower associated cost are selected (line 4 of Algorithm 2) using, for example, the following:

$$\lambda PRM > \lambda * PRM = 2\left(1 + \frac{1}{d}\right)^{\frac{1}{d}}\left(\frac{\mu(X_{free})}{d}\right)^{\frac{1}{d}}$$

Then, from $EE_{closest}$ to $EE_r$ state, the dynamic propagation is generated using a Jacobian control:

$$x(t) = FW(q(t))$$

$$\dot{x}(t) = J(q(t))\dot{q}(t)$$

where x(t), ẋ(t) are the interpolated cartesian position and velocity from $EE_{closest}$ to $EE_r$ at a time instant t, i.e., a discretization time step; FW( ) s the forward kinematics mapping and J(q(t)) the Jacobian. Finally, q(t) and q̇(t) are the joint positions and velocities. If joint velocity or position is violated, the node is rejected.

To obtain the trajectory q(t), the forward kinematics may be computed for the positions x(t) at each time step, enabling a determination as to whether any part (e.g., joints) of the robotic device intersect an occupied voxel. If so, the node may be rejected and another random pose generated (line 6 of Algorithm 2). Otherwise, the cost of the node is computed using the propagated positions as follows:

$$C = \sum_{t=0}^{t=T}|q(t-1) - q(t)| + \beta(t)$$

and $\beta(t)=\Sigma 0.01$ ($l_f$)+l, where $l_f$ is the link distance that is contained in free voxels and l the resultant link distance, contained in unknown of frontier voxels (computed using the forward kinematics), t=0 corresponds to $x(0)=EE_{closest}$ and $x(T)=EE_r$. In this manner, a directed graph towards the goal is created by connecting lower-cost nodes based on the amount of trajectory traversal in each of the different voxel states and preferring voxels in the free state. The more the trajectory is within free voxels, the less cost is assigned to that node (e.g., vertex) connectivity.

Algorithm 2 also includes a rewiring process to improve graph connectivity according to the cost (lines 9-15 in Algorithm 2). The remaining nodes in the closest list are iterated to determine if they are feasible and have a lower cost. If these conditions are true, then these nodes are reconnected. Algorithm 2 ends when $EE_r$ is close to the desired pose $EE_d$, returning the sequence q(t) from $EE_a$ to the last $EE_r$.

FIG. 5 illustrates an example of pyramidal map compression 505, according to an embodiment. This technique compresses mapped regions, which may be useful for transmission of the mapped for a mixed reality human-robot command interface. A pyramidal representation of the produced map at different resolutions is created. First. all occupied voxels—all voxels with 0x0011 at the lower part of the hash key—are selected from the voxel list of the map to produce a sub-list containing only the occupied voxels. When the complete map list of voxels is ordered, this operation also produces an ordered list. Then, one list element is taken for each resolution level from the sub-list and another list element is not. This may be an alternating pattern (e.g., every other), or another pattern of inclusion (e.g., every third element) and corresponding exclusion.

A bit-wise right shift operation may be performed for the selected voxel hash keys to generate the keys for that resolution level. This produces a pyramidal representation of the map 510, as illustrated, for three different resolution levels.

In an example, the compression may enable more powerful human visualization and interaction with the robotic device. For example, the compressed representation of the map may be used to facilitate user interaction using augmented reality (AR) by, for example, creating a virtual environment. Here, the compressed map (e.g., scene) may be sent to a holographic head-mounted display containing only the center of each voxel. a hull shader and domain shader may be used to create visual geometry during the rendering process, and only for those rendered boxes, to eliminate a need for eight vertexes per cube during rendering. Rather, boxes on the hull shader may be generated based on a voxel center and a coordinate frame orientation. Creating this geometry on a GPU during render reduces network bandwidth and produces better results because rounded cubes or spheres may be tessellated and generated. In an example, a vertex shader only translates the points as needed, a hull shader creates eight control points, a domain shader creates a mesh for the cube or sphere, and a pixel shader colors the three-dimensional object.

Such an AR system may enable remote manipulation of objects by interacting with the virtual scene or controlling the robotic device to grasp or touch an object. Thus, an efficient map representation for the robotic device workspace that directly incorporates dynamic obstacles is created. This representation enables bit-level operations to recover the properties of map, such as occupied or frontier space. These properties generate new motions for the robot to visualize the scene based on obstacle orthogonality resulting in a safe and efficient mechanism by which a robotic device is used to map a workspace.

Figure 6:
FIG. 6 illustrates a flow diagram of an example of a method for robotic device workspace mapping, according to an embodiment.
Figure 6:
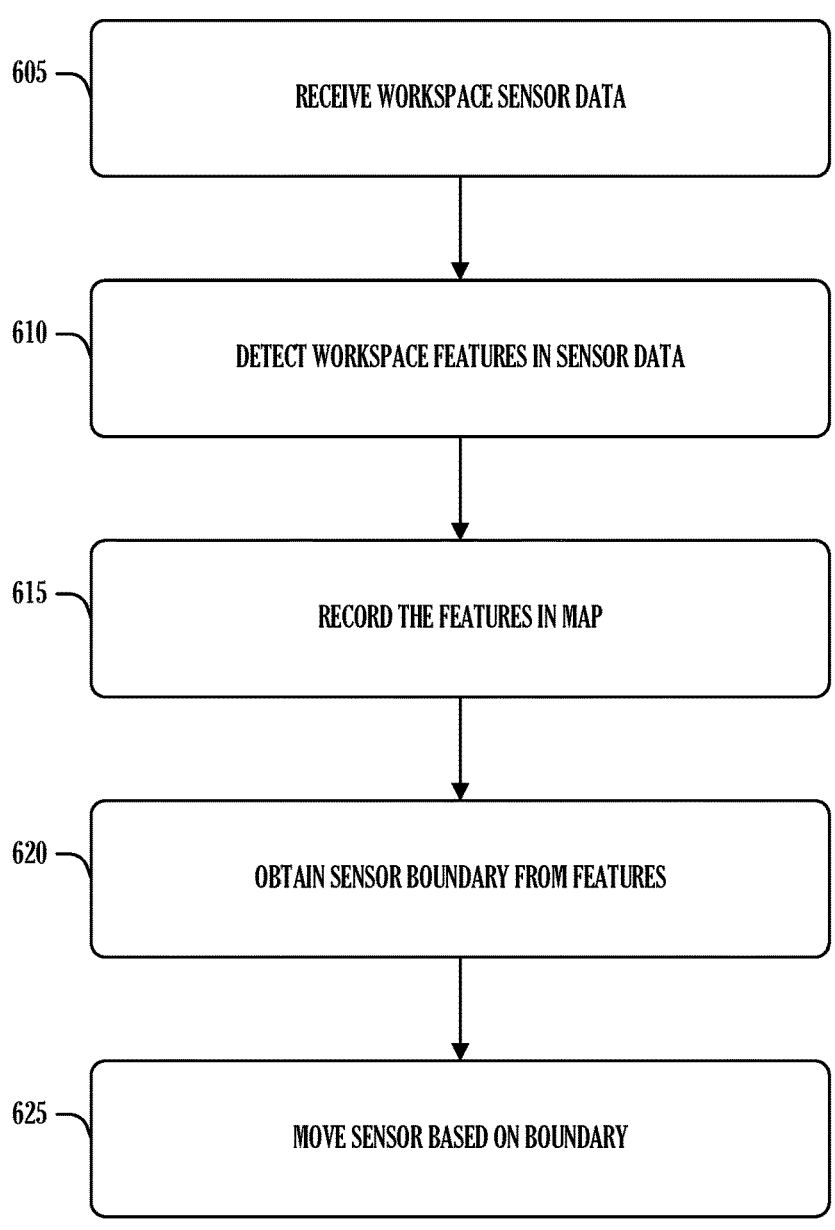

FIG. 6 illustrates a flow diagram of an example of a method 600 for robotic device workspace mapping, according to an embodiment. The operations of the method 600 are performed by computational hardware, such as that described above or below (e.g., processing circuitry).

At operation 605, sensor data of a workspace is obtained. The sensor that captures the sensor data is affixed to a movable portion of a robotic device. This sensor has a field of view that covers a first portion of the workspace that is less than the complete workspace. In an example, the sensor is a depth camera. In an example, the robotic device incudes a member that is fixed to a structure of the workspace. In an example, the robotic device is an arm. In an example, the sensor is affixed to an end effector of the arm.

At operation 610, features of the workspace are detected from the sensor data.

At operation 615, the features of the workspace are recorded in a map of the workspace. In an example, the map has three dimensions and the features of the workspace are represented by voxels. In an example, the voxels are stored in the map with a bitwise representation in which a first set of bits represents a depth dimension, a second set of bits represents a width dimension, a third set of bits represents a height dimension, and a fourth set of bits represents a status. In an example, the status is at least one of UNKNOWN, BOUNDARY, FREE, or OCCUPIED. In an example, the map is initialized such that entries in the map have values corresponding to UNKNOWN. In an example, the status of OCCUPIED corresponds to a sensor reading. In an example, the status of FREE corresponds to an absence of a sensor reading in the field of view of the sensor when data from the sensor is captured. In an example, the status of FREE is determined by tracing a ray from a position corresponding to the sensor in the map to either an entry with the value of OCCUPIED or a boundary of the workspace. In an example, the bitwise representation is thirty two bits, and wherein each of the depth dimension, the width dimension, and height dimension and each represented by eight bits.

At operation 620, a sensor boundary is determined from the sensor data. In an example, the sensor boundary is an entry in the map with a neighbor entry that has a value corresponding to UNKNOWN.

At operation 625, the movable portion of the robotic device is moved based on the sensor boundary to place the field of view of the sensor on a second portion of the workspace. In an example, moving the movable portion of the robotic device includes calculating a goal pose of the movable portion of the robotic device and moving the movable portion of the robotic device to meet the goal pose. In an example, calculating the goal pose includes finding multiple possible goal poses. In an example, the multiple possible goal poses are randomly generated. In an example, a rapidly exploring random tree is used to create the multiple possible goal poses.

In an example, the goal pose is selected based on a cost function. In an example, the cost function is based on a present pose of the sensor. In an example, the cost function weights maintaining a present orientation of the sensor as more valuable than changing the present orientation of the sensor. In an example, the cost function weights movement from the present pose of the sensor through map entries with a value corresponding to FREE as more valuable than movement through map entries with another value.

In an example, the method 600 may be extended to include creating a compressed map. The compressed map may be created by compressing the map into a pyramidal representation at different resolutions. In an example, the compressed map includes entries with values corresponding to OCCUPIED.

Figure 7:
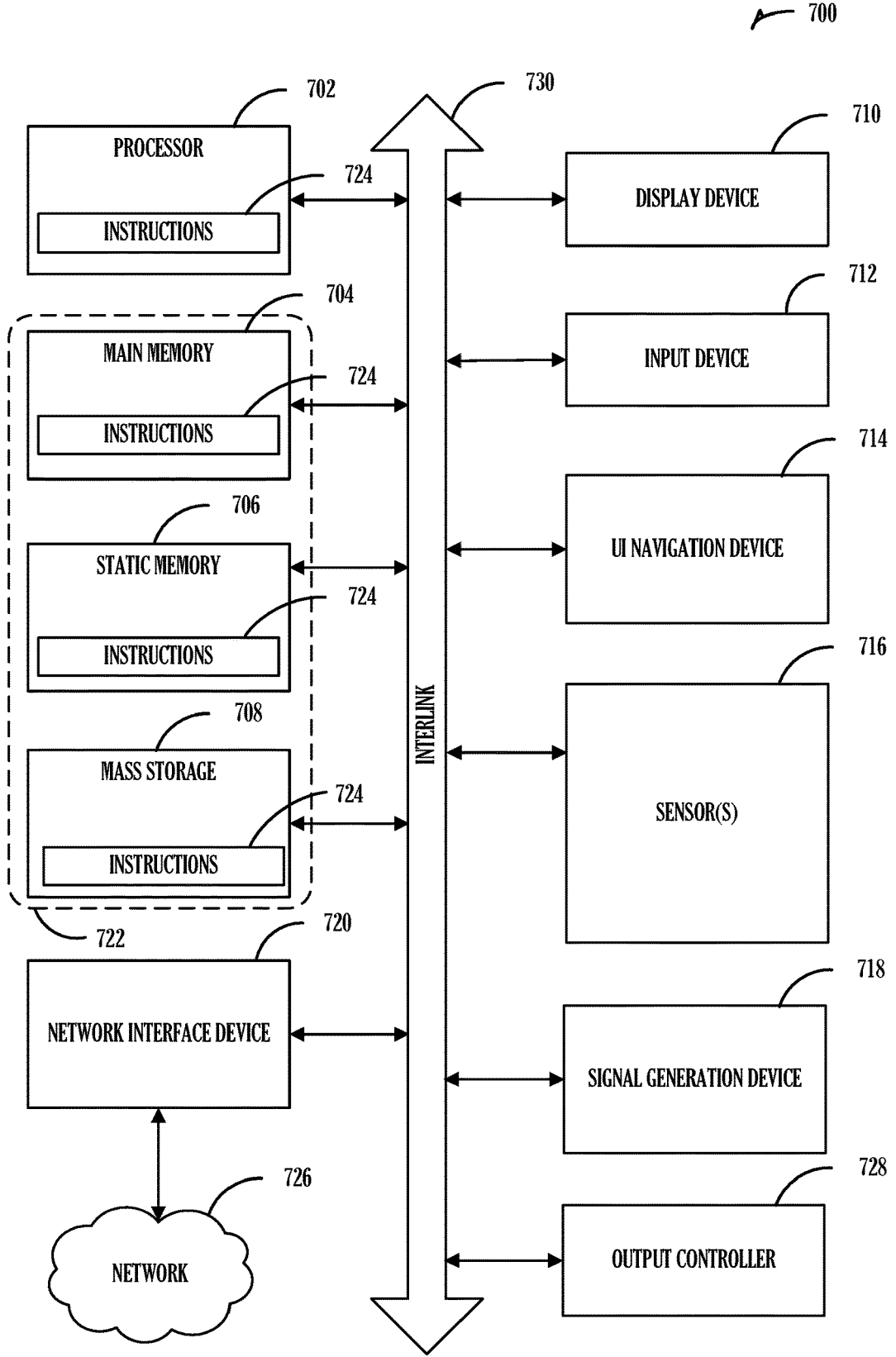
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708

(e.g., hard drives, tape drives, flash storage, or other block devices) some or all of which may communicate with each other via an interlink (e.g., bus) 730. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 may be, or include, a machine readable medium 722 on which is stored one or more sets of data structures or instructions 724 (e.g., software) embodying or utilized by any one or more of the techniques or functions described herein. The instructions 724 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine readable media 722. While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 722 may be representative of the instructions 724, such as instructions 724 themselves or a format from which the instructions 724 may be derived. This format from which the instructions 724 may be derived may include source code, encoded instructions (e.g., in compressed or encrypted form), packaged instructions (e.g., split into multiple packages), or the like. The information representative of the instructions 724 in the machine readable medium 722 may be processed by processing circuitry into the instructions to implement any of the operations discussed herein. For example, deriving the instructions 724 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 724.

In an example, the derivation of the instructions 724 may include assembly, compilation, or interpretation of the information (e.g., by the processing circuitry) to create the instructions 724 from some intermediate or preprocessed format provided by the machine readable medium 722. The information, when provided in multiple parts, may be combined, unpacked, and modified to create the instructions 724. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 724 may be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

ADDITIONAL NOTES & EXAMPLES

Example 1 is an apparatus for robotic device workspace mapping, the apparatus comprising: a memory including instructions; and processing circuitry that, when in operation, is configured by the instructions to: obtain sensor data of a workspace from a sensor of a robotic device, the sensor affixed to a movable portion of the robotic device, the sensor having a field of view that covers a first portion of the workspace that is less than the workspace; detect features of the workspace from the sensor data; record the features of the workspace in a map of the workspace; determine a sensor boundary from the sensor data; and move the movable portion of the robotic device based on the sensor boundary to change the field of view of the sensor to cover a second portion of the workspace.

In Example 2, the subject matter of Example 1, wherein, to move the movable portion of the robotic device, the processing circuitry is configured to: calculate a goal pose of the movable portion of the robotic device; and move the movable portion of the robotic device to meet the goal pose.

In Example 3, the subject matter of Example 2, wherein, to calculate the goal pose, the processing circuitry is configured to find multiple possible goal poses and selecting the goal pose based on a cost function.

In Example 4, the subject matter of Example 3, wherein the cost function is based on a present orientation of the sensor, wherein the cost function weights maintaining a present orientation of the sensor as more valuable than changing the present orientation of the sensor.

In Example 5, the subject matter of Example 4, wherein the cost function weights movement from the present pose of the sensor through map entries with a value corresponding to FREE as more valuable that movement through map entries with another value.

In Example 6, the subject matter of any of Examples 3-5, wherein the multiple possible goal poses are randomly generated.

In Example 7, the subject matter of Example 6, wherein a rapidly exploring random tree is used to create the multiple possible goal poses.

In Example 8, the subject matter of any of Examples 1-7, wherein the map has three dimensions, and wherein the features of the workspace are represented by voxels.

In Example 9, the subject matter of Example 8, wherein the sensor is a depth camera.

In Example 10, the subject matter of any of Examples 8-9, wherein the voxels are stored in the map with a bitwise representation in which a first set of bits represents a depth dimension, a second set of bits represents a width dimension, a third set of bits represents a height dimension, and a fourth set of bits represents a status.

In Example 11, the subject matter of Example 10, wherein the status is at least one of UNKNOWN, BOUNDARY, FREE, or OCCUPIED.

In Example 12, the subject matter of Example 11, wherein OCCUPIED corresponds to a feature in the sensor data.

In Example 13, the subject matter of Example 12, wherein FREE corresponds to an absence of a feature in the sensor data in the field of view of the sensor when data from the sensor is captured.

In Example 14, the subject matter of Example 13, wherein FREE is determined by tracing a ray from a position corresponding to the sensor in the map to either an entry with a value of OCCUPIED or a boundary of the workspace.

In Example 15, the subject matter of any of Examples 10-14, wherein the bitwise representation is thirty two bits, and wherein each of the depth dimension, the width dimension, and the height dimension are represented by eight bits.

In Example 16, the subject matter of any of Examples 1-15, wherein the robotic device incudes a member that is fixed to a structure of the workspace.

In Example 17, the subject matter of any of Examples 1-16, wherein the robotic device is an arm.

In Example 18, the subject matter of Example 17, wherein the sensor is affixed to an end effector of the arm.

In Example 19, the subject matter of any of Examples 1-18, wherein the map is initialized such that entries in the map have values corresponding to UNKNOWN.

In Example 20, the subject matter of Example 19, wherein the sensor boundary is an entry in the map with a neighbor entry that has a value corresponding to UNKNOWN.

In Example 21, the subject matter of any of Examples 1-20, wherein the processing circuitry is configured to create a compressed map by compressing the map into a pyramidal representation at different resolutions, the compressed map including entries with values corresponding to OCCUPIED.

Example 22 is a method for robotic device workspace mapping, the method comprising: obtaining sensor data of a workspace from a sensor of a robotic device, the sensor affixed to a movable portion of the robotic device, the sensor having a field of view that covers a first portion of the workspace that is less than the workspace; detecting features of the workspace from the sensor data; recording the features of the workspace in a map of the workspace; determining a sensor boundary from the sensor data; and moving the movable portion of the robotic device based on the sensor boundary to change the field of view of the sensor to cover a second portion of the workspace.

In Example 23, the subject matter of Example 22, wherein moving the movable portion of the robotic device includes: calculating a goal pose of the movable portion of the robotic device; and moving the movable portion of the robotic device to meet the goal pose.

In Example 24, the subject matter of Example 23, wherein calculating the goal pose includes finding multiple possible goal poses and selecting the goal pose based on a cost function.

In Example 25, the subject matter of Example 24, wherein the cost function is based on a present orientation of the sensor, wherein the cost function weights maintaining a present orientation of the sensor as more valuable than changing the present orientation of the sensor.

In Example 26, the subject matter of Example 25, wherein the cost function weights movement from the present pose of the sensor through map entries with a value corresponding to FREE as more valuable that movement through map entries with another value.

In Example 27, the subject matter of any of Examples 24-26, wherein the multiple possible goal poses are randomly generated.

In Example 28, the subject matter of Example 27, wherein a rapidly exploring random tree is used to create the multiple possible goal poses.

In Example 29, the subject matter of any of Examples 22-28, wherein the map has three dimensions, and wherein the features of the workspace are represented by voxels.

In Example 30, the subject matter of Example 29, wherein the sensor is a depth camera.

In Example 31, the subject matter of any of Examples 29-30, wherein the voxels are stored in the map with a bitwise representation in which a first set of bits represents a depth dimension, a second set of bits represents a width dimension, a third set of bits represents a height dimension, and a fourth set of bits represents a status.

In Example 32, the subject matter of Example 31, wherein the status is at least one of UNKNOWN, BOUNDARY, FREE, or OCCUPIED.

In Example 33, the subject matter of Example 32, wherein OCCUPIED corresponds to a feature in the sensor data.

In Example 34, the subject matter of Example 33, wherein FREE corresponds to an absence of a feature in the sensor data in the field of view of the sensor when data from the sensor is captured.

In Example 35, the subject matter of Example 34, wherein FREE is determined by tracing a ray from a position corresponding to the sensor in the map to either an entry with a value of OCCUPIED or a boundary of the workspace.

In Example 36, the subject matter of any of Examples 31-35, wherein the bitwise representation is thirty two bits, and wherein each of the depth dimension, the width dimension, and the height dimension are represented by eight bits.

In Example 37, the subject matter of any of Examples 22-36, wherein the robotic device incudes a member that is fixed to a structure of the workspace.

In Example 38, the subject matter of any of Examples 22-37, wherein the robotic device is an arm.

In Example 39, the subject matter of Example 38, wherein the sensor is affixed to an end effector of the arm.

In Example 40, the subject matter of any of Examples 22-39, wherein the map is initialized such that entries in the map have values corresponding to UNKNOWN.

In Example 41, the subject matter of Example 40, wherein the sensor boundary is an entry in the map with a neighbor entry that has a value corresponding to UNKNOWN.

In Example 42, the subject matter of any of Examples 22-41, comprising creating a compressed map by compressing the map into a pyramidal representation at different resolutions, the compressed map including entries with values corresponding to OCCUPIED.

Example 43 is a at least one machine readable medium including instructions for robotic device workspace mapping, the instructions, when executed by processing circuitry, cause the processing circuitry to perform operations comprising: obtaining sensor data of a workspace from a sensor of a robotic device, the sensor affixed to a movable portion of the robotic device, the sensor having a field of view that covers a first portion of the workspace that is less than the workspace; detecting features of the workspace from the sensor data; recording the features of the workspace in a map of the workspace; determining a sensor boundary from the sensor data; and moving the movable portion of the robotic device based on the sensor boundary to change the field of view of the sensor to cover a second portion of the workspace.

In Example 44, the subject matter of Example 43, wherein moving the movable portion of the robotic device includes: calculating a goal pose of the movable portion of the robotic device; and moving the movable portion of the robotic device to meet the goal pose.

In Example 45, the subject matter of Example 44, wherein calculating the goal pose includes finding multiple possible goal poses and selecting the goal pose based on a cost function.

In Example 46, the subject matter of Example 45, wherein the cost function is based on a present orientation of the sensor, wherein the cost function weights maintaining a present orientation of the sensor as more valuable than changing the present orientation of the sensor.

In Example 47, the subject matter of Example 46, wherein the cost function weights movement from the present pose of the sensor through map entries with a value corresponding to FREE as more valuable that movement through map entries with another value.

In Example 48, the subject matter of any of Examples 45-47, wherein the multiple possible goal poses are randomly generated.

In Example 49, the subject matter of Example 48, wherein a rapidly exploring random tree is used to create the multiple possible goal poses.

In Example 50, the subject matter of any of Examples 43-49, wherein the map has three dimensions, and wherein the features of the workspace are represented by voxels.

In Example 51, the subject matter of Example 50, wherein the sensor is a depth camera.

In Example 52, the subject matter of any of Examples 50-51, wherein the voxels are stored in the map with a bitwise representation in which a first set of bits represents a depth dimension, a second set of bits represents a width dimension, a third set of bits represents a height dimension, and a fourth set of bits represents a status.

In Example 53, the subject matter of Example 52, wherein the status is at least one of UNKNOWN, BOUNDARY, FREE, or OCCUPIED.

In Example 54, the subject matter of Example 53, wherein OCCUPIED corresponds to a feature in the sensor data.

In Example 55, the subject matter of Example 54, wherein FREE corresponds to an absence of a feature in the sensor data in the field of view of the sensor when data from the sensor is captured.

In Example 56, the subject matter of Example 55, wherein FREE is determined by tracing a ray from a position corresponding to the sensor in the map to either an entry with a value of OCCUPIED or a boundary of the workspace.

In Example 57, the subject matter of any of Examples 52-56, wherein the bitwise representation is thirty two bits, and wherein each of the depth dimension, the width dimension, and the height dimension are represented by eight bits.

In Example 58, the subject matter of any of Examples 43-57, wherein the robotic device incudes a member that is fixed to a structure of the workspace.

In Example 59, the subject matter of any of Examples 43-58, wherein the robotic device is an arm.

In Example 60, the subject matter of Example 59, wherein the sensor is affixed to an end effector of the arm.

In Example 61, the subject matter of any of Examples 43-60, wherein the map is initialized such that entries in the map have values corresponding to UNKNOWN.

In Example 62, the subject matter of Example 61, wherein the sensor boundary is an entry in the map with a neighbor entry that has a value corresponding to UNKNOWN.

In Example 63, the subject matter of any of Examples 43-62, wherein the operations comprise creating a compressed map by compressing the map into a pyramidal representation at different resolutions, the compressed map including entries with values corresponding to OCCUPIED.

Example 64 is a system for robotic device workspace mapping, the system comprising: means for obtaining sensor data of a workspace from a sensor of a robotic device, the sensor affixed to a movable portion of the robotic device, the sensor having a field of view that covers a first portion of the workspace that is less than the workspace; means for detecting features of the workspace from the sensor data; means for recording the features of the workspace in a map of the workspace; means for determining a sensor boundary from the sensor data; and means for moving the movable portion of the robotic device based on the sensor boundary to change the field of view of the sensor to cover a second portion of the workspace.

In Example 65, the subject matter of Example 64, wherein the means for moving the movable portion of the robotic device include: means for calculating a goal pose of the movable portion of the robotic device; and means for moving the movable portion of the robotic device to meet the goal pose.

In Example 66, the subject matter of Example 65, wherein the means for calculating the goal pose include means for finding multiple possible goal poses and selecting the goal pose based on a cost function.

In Example 67, the subject matter of Example 66, wherein the cost function is based on a present orientation of the sensor, wherein the cost function weights maintaining a present orientation of the sensor as more valuable than changing the present orientation of the sensor.

In Example 68, the subject matter of Example 67, wherein the cost function weights movement from the present pose of the sensor through map entries with a value corresponding to FREE as more valuable that movement through map entries with another value.

In Example 69, the subject matter of any of Examples 66-68, wherein the multiple possible goal poses are randomly generated.

In Example 70, the subject matter of Example 69, wherein a rapidly exploring random tree is used to create the multiple possible goal poses.

In Example 71, the subject matter of any of Examples 64-70, wherein the map has three dimensions, and wherein the features of the workspace are represented by voxels.

In Example 72, the subject matter of Example 71, wherein the sensor is a depth camera.

In Example 73, the subject matter of any of Examples 71-72, wherein the voxels are stored in the map with a bitwise representation in which a first set of bits represents a depth dimension, a second set of bits represents a width dimension, a third set of bits represents a height dimension, and a fourth set of bits represents a status.

In Example 74, the subject matter of Example 73, wherein the status is at least one of UNKNOWN, BOUNDARY, FREE, or OCCUPIED.

In Example 75, the subject matter of Example 74, wherein OCCUPIED corresponds to a feature in the sensor data.

In Example 76, the subject matter of Example 75, wherein FREE corresponds to an absence of a feature in the sensor data in the field of view of the sensor when data from the sensor is captured.

In Example 77, the subject matter of Example 76, wherein FREE is determined by tracing a ray from a position corresponding to the sensor in the map to either an entry with a value of OCCUPIED or a boundary of the workspace.

In Example 78, the subject matter of any of Examples 73-77, wherein the bitwise representation is thirty two bits, and wherein each of the depth dimension, the width dimension, and the height dimension are represented by eight bits.

In Example 79, the subject matter of any of Examples 64-78, wherein the robotic device incudes a member that is fixed to a structure of the workspace.

In Example 80, the subject matter of any of Examples 64-79, wherein the robotic device is an arm.

In Example 81, the subject matter of Example 80, wherein the sensor is affixed to an end effector of the arm.

In Example 82, the subject matter of any of Examples 64-81, wherein the map is initialized such that entries in the map have values corresponding to UNKNOWN.

In Example 83, the subject matter of Example 82, wherein the sensor boundary is an entry in the map with a neighbor entry that has a value corresponding to UNKNOWN.

In Example 84, the subject matter of any of Examples 64-83, comprising means for creating a compressed map by compressing the map into a pyramidal representation at different resolutions, the compressed map including entries with values corresponding to OCCUPIED.

Example 85 is at least one machine-readable medium including instructions that, when executed by processing circuitry, cause the processing circuitry to perform operations to implement of any of Examples 1-84.

Example 86 is an apparatus comprising means to implement of any of Examples 1-84.

Example 87 is a system to implement of any of Examples 1-84.

Example 88 is a method to implement of any of Examples 1-84.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. An apparatus for robotic device workspace mapping, the apparatus comprising:

a memory including instructions; and processing circuitry that, when in operation, is configured by the instructions to:

obtain sensor data of a workspace from a sensor of a robotic device, the sensor affixed to a movable portion of the robotic device, the sensor having a field of view that covers a first portion of the workspace that is less than the workspace;

detect features of the workspace from the sensor data;

record the features of the workspace in a map of the workspace, wherein the map has three dimensions, and wherein the features of the workspace are represented by voxels, wherein the voxels are stored in the map with a bitwise representation in which a first set of bits represents a depth dimension, a second set of bits represents a width dimension, a third set of bits represents a height dimension, and a fourth set of bits represents a status, and wherein the workspace is represented by a hash map where the bitwise representation is hash to make a hash key for an entry in the hash map that contains the bitwise representation;

determine a sensor boundary from the sensor data to create a set of bitwise representations of voxels neighboring the sensor boundary;

store a set of hash keys, created by hashing the set of bitwise representations of the voxels neighboring the sensor boundary, in a visit list; and move the movable portion of the robotic device based on the sensor boundary to change the field of view of the sensor to cover a second portion of the workspace, wherein to move the movable portion of the robotic device based on the sensor boundary includes to select an entry from the visit list.

2. The apparatus of claim 1, wherein, to move the movable portion of the robotic device, the processing circuitry is configured to:

calculate a goal pose of the movable portion of the robotic device; and move the movable portion of the robotic device to meet the goal pose.

3. The apparatus of claim 2, wherein, to calculate the goal pose, the processing circuitry is configured to find multiple possible goal poses and selecting the goal pose based on a cost function.

4. The apparatus of claim 3, wherein the cost function is based on a present orientation of the sensor, wherein the cost function weights maintaining a present orientation of the sensor as more valuable than changing the present orientation of the sensor.

5. The apparatus of claim 4, wherein the cost function weights movement from the present pose of the sensor through map entries with a value corresponding to FREE as more valuable than movement through map entries with another value.

6. The apparatus of claim 3, wherein the multiple possible goal poses are randomly generated.

7. The apparatus of claim 6, wherein a rapidly exploring random tree is used to create the multiple possible goal poses.

8. The apparatus of claim 1, wherein the map is initialized such that entries in the map have values corresponding to UNKNOWN.

9. The apparatus of claim 8, wherein the sensor boundary is an entry in the map with a neighbor entry that has a value corresponding to UNKNOWN.

10. The apparatus of claim 1, wherein the processing circuitry is configured to create a compressed map by compressing the map into a pyramidal representation at different resolutions, the compressed map including entries with values corresponding to OCCUPIED.

11. At least one non-transitory machine readable medium including instructions for robotic device workspace mapping, the instructions, when executed by processing circuitry, cause the processing circuitry to perform operations comprising:

obtaining sensor data of a workspace from a sensor of a robotic device, the sensor affixed to a movable portion of the robotic device, the sensor having a field of view that covers a first portion of the workspace that is less than the workspace;

detecting features of the workspace from the sensor data;

recording the features of the workspace in a map of the workspace, wherein the map has three dimensions, and wherein the features of the workspace are represented by voxels, wherein the voxels are stored in the map with a bitwise representation in which a first set of bits represents a depth dimension, a second set of bits represents a width dimension, a third set of bits represents a height dimension, and a fourth set of bits represents a status, and wherein the workspace is represented by a hash map where the bitwise representation is hash to make a hash key for an entry in the hash map that contains the bitwise representation;

determining a sensor boundary from the sensor data to create a set of bitwise representations of voxels neighboring the sensor boundary;

store a set of hash keys, created by hashing the set of bitwise representations of the voxels neighboring the sensor boundary, in a visit list; and moving the movable portion of the robotic device based on the sensor boundary to change the field of view of the sensor to cover a second portion of the workspace, wherein moving the movable portion of the robotic device based on the sensor boundary includes to select an entry from the visit list.

12. The at least one non-transitory machine readable medium of claim 11, wherein moving the movable portion of the robotic device includes:

calculating a goal pose of the movable portion of the robotic device; and moving the movable portion of the robotic device to meet the goal pose.

13. The at least one non-transitory machine readable medium of claim 12, wherein calculating the goal pose includes finding multiple possible goal poses and selecting the goal pose based on a cost function.

14. The at least one non-transitory machine readable medium of claim 13, wherein the cost function is based on a present orientation of the sensor, wherein the cost function weights maintaining a present orientation of the sensor as more valuable than changing the present orientation of the sensor.

15. The at least one non-transitory machine readable medium of claim 14, wherein the cost function weights movement from the present pose of the sensor through map entries with a value corresponding to FREE as more valuable than movement through map entries with another value.

16. The at least one non-transitory machine readable medium of claim 13, wherein the multiple possible goal poses are randomly generated.

17. The at least one non-transitory machine readable medium of claim 16, wherein a rapidly exploring random tree is used to create the multiple possible goal poses.

18. The at least one non-transitory machine readable medium of claim 11, wherein the map is initialized such that entries in the map have values corresponding to UNKNOWN.

19. The at least one non-transitory machine readable medium of claim 18, wherein the sensor boundary is an entry in the map with a neighbor entry that has a value corresponding to UNKNOWN.

20. The at least one non-transitory machine readable medium of claim 11, wherein the operations comprise creating a compressed map by compressing the map into a pyramidal representation at different resolutions, the compressed map including entries with values corresponding to OCCUPIED.

\*   \*   \*   \*   \*